United States Patent [19]
Bauer et al.

[11] Patent Number: 6,148,494
[45] Date of Patent: Nov. 21, 2000

[54] FLOATING FASTENER TOLERANCE METHOD

[75] Inventors: Lowell Wilson Bauer, Schenectady, N.Y.; Richard Alan Wesling, Cincinnati, Ohio

[73] Assignee: General Electric Company, Schenectady, N.Y.

[21] Appl. No.: 09/288,160

[22] Filed: Apr. 8, 1999

[51] Int. Cl.[7] .................................................. B23Q 17/00
[52] U.S. Cl. .................................. 29/407.05; 29/407.01; 29/407.1; 703/2; 703/6
[58] Field of Search ........................... 29/407.01, 407.05, 29/407.09, 407.1; 703/2, 6

[56] References Cited

U.S. PATENT DOCUMENTS

| | | | |
|---|---|---|---|
| 4,918,627 | 4/1990 | Garcia et al. | 364/552 |
| 5,047,947 | 9/1991 | Stump | 364/468 |
| 5,301,118 | 4/1994 | Heck et al. | 364/468 |
| 5,691,909 | 11/1997 | Frey et al. | 364/474.01 |
| 5,719,796 | 2/1998 | Chen | 364/578 |
| 5,893,069 | 4/1999 | White, Jr. | 705/1 |
| 5,966,312 | 10/1999 | Chen | 364/578 |
| 5,974,246 | 10/1999 | Nakazawa | 395/500.23 |

FOREIGN PATENT DOCUMENTS 317539  5/1989  European Pat. Off. ........ B23P 19/04

OTHER PUBLICATIONS

"Avoiding Assembly Misfits", Manufacturing Engineering, pp. 53–55, Jun. 1990.

*Primary Examiner*—David P. Bryant
*Assistant Examiner*—Essama Omgba
*Attorney, Agent, or Firm*—Marvin Snyder; Douglas E. Stoner

[57] ABSTRACT

A tolerancing method includes modeling positions and sizes of apertures in an assembly of parts. The parts are best-fit together. Aperture position in the parts is statistically varied. The best-fitting and statistical variations of the aperture positions are repeated for a statistically significant number of trials to create a statistical model. The size of fasteners for assembly through the mating apertures may be selected as determined in the statistical model.

14 Claims, 4 Drawing Sheets

FLOATING FASTENER TOLERANCE METHOD

BACKGROUND OF THE INVENTION

This invention relates generally to floating fasteners in assembled parts and, more specifically, to tolerancing of such floating fasteners.

Two or more parts may be fastened together using a fastener extending through mating apertures in the parts. Since the fastener is typically smaller in cross-section than the apertures, a clearance exists between the fastener and aperture which allows the fastener to float radially until it is secured in position.

A typical aperture is circular and is usually formed by being drilled through the mating parts. The typical fastener is in the form of a cylindrical bolt threaded on at least one end for being tightened in tension across the parts using a cooperating nut. The fastener and apertures may have other cross-sectional configurations as desired.

Maximum joint strength may be obtained by maximizing the diameter of the fastener and minimizing the radial clearance in the mating holes. However, this becomes more difficult as a series of mating apertures and corresponding fasteners are required. For example, two parts may be joined together using an annular array of fasteners extending through a corresponding annular array of mounting holes arranged in mating pairs in two or more parts. The bolt holes are therefore arranged annularly.

The bolt-hole circle joining arrangement is commonly found in both stationary and rotating parts. A typical stationary part example is the joining of two sections of pipe at corresponding radial end flanges through which an array of mounting bolts are tightened to form a compression joint.

Exemplary rotating parts may be found in rotor components of a gas turbine engine such as rotor disks and cooperating driveshafts therein which require accurate or precise symmetry for maximizing initial balance for operating at relatively high rotational speeds.

The bolt-hole circle on each part of the assembly is typically formed with mounting holes of uniform or equal nominal diameter. The holes are typically positioned at a common nominal radius from the axial centerline axis of the parts and spaced apart on centers at a uniform nominal circumferential spacing.

During assembly, the bolt-hole circles of the adjoining parts are suitably aligned with each other so that the individual fasteners may be inserted through corresponding pairs of the mating holes. The fasteners usually have a common nominal outer diameter which is maximized so as to completely fill each of the mating holes with minimal radial clearance. The maximum fastener size and minimum radial clearance improve the strength of the assembled joint and reduce the inherent unbalance of the joint.

Because the position and size of the mounting holes, and the size of the fasteners, necessarily vary statistically during manufacture, they are specified with a desired nominal value and with a specific variation or tolerance typically expressed in positive and negative mils which determine the precision requirements of the manufacturing equipment. Small tolerances require correspondingly higher precision in manufacturing, typically effected at greater cost and manufacturing effort. Large tolerances allow use of less precise manufacturing equipment with a corresponding reduction in manufacturing cost and effort.

Since gas turbine engine components require precision manufacture, precision manufacturing equipment is normally required for accurately forming both the fasteners and their mounting holes in the adjoining parts. Nevertheless, each of the many fasteners, and each of the many mounting holes in the adjoining parts, is individually subject to statistical variation in size and position. An exemplary statistical variation is the common bell or gaussian curve, although others are also known. Variation in position and size may be greater than or less than the nominal or optimum values.

Floating fastener joint design becomes even more complex as the number of fasteners and corresponding mating holes increases. In a typical gas turbine engine, tens of fasteners are used in a typical floating fastener assembly of two or more adjoining annular parts. The high number of mating holes substantially increases the likelihood of misalignment between one or more of the mating hole locations. Misalignment at any one location causes a radial overlap between mating holes which effectively decreases the available diameter through which the fastener may be inserted. Inability to insert even one of the many fasteners through its respective mating hole, due to interference with the hole, is unacceptable.

It is common, however, to cool an interfering fastener, with dry ice for example, to temporarily reduce its diameter so as to minimize or reduce the interference with the misaligned mating hole and complete the assembly. If this is unsuccessful, the joint must be disassembled and the parts re-indexed in an attempt to obtain complete assembly of all of the fasteners through respective mating holes. Alternatively, replacement parts or fasteners must be used.

In order to reduce the likelihood of joint misalignment due to one or more floating fasteners in a bolt-hole circle, the differences in diameter between fasteners and their mating holes may be suitably increased, but at the expense of an undesirable increase in clearance therebetween. Alternatively, different ranges of variation in position and size may be specified in an attempt to reduce the likelihood of misalignment. However, these solutions are based primarily on previous manufacturing experience which is typically of limited extent and thus ineffective for optimizing the floating fastener joints.

Accordingly, it is desired to provide a method of tolerancing floating fasteners and mating apertures which improves assembly of a plurality of parts.

BRIEF SUMMARY OF THE INVENTION

A tolerancing method includes modeling position and size of apertures in an assembly of parts. The parts are best-fit together. Aperture position in the parts is statistically varied. The best-fitting and statistical variation are repeated for a statistically significant number of trials. The size of fasteners for assembly through the mating apertures may then be selected, with corresponding appropriate tolerances.

BRIEF DESCRIPTION THE DRAWINGS

DETAILED DESCRIPTION OF THE INVENTION

Figure 1:
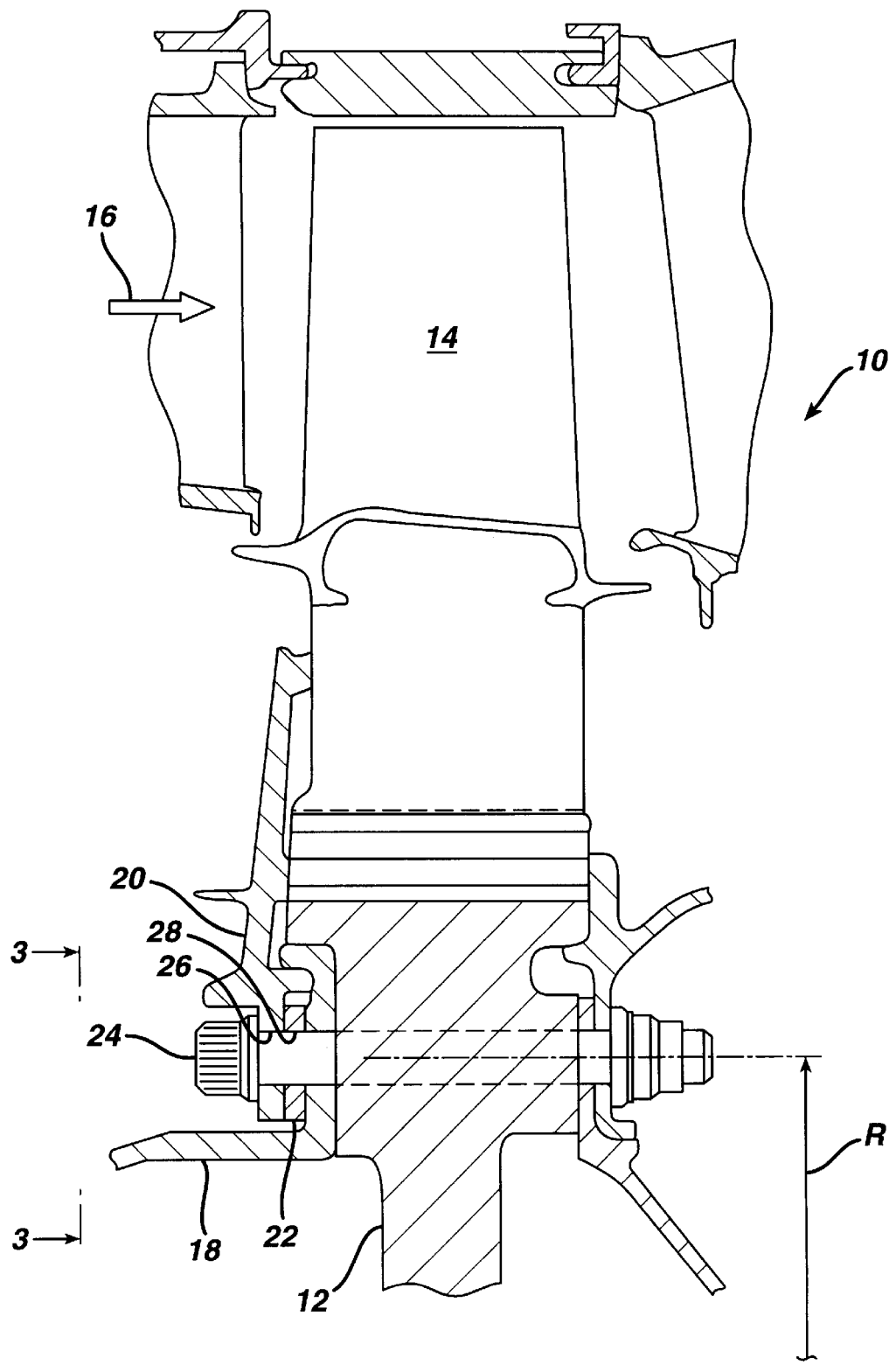
FIG. 1 is a partly sectional, elevational view of an annular turbine rotor of a gas turbine engine having annular parts joined together with floating fasteners in accordance with an exemplary embodiment of the present invention.

Illustrated in FIG. 1 is the rotor of a single stage high pressure turbine 10 of a gas turbine engine. The turbine includes an annular rotor 12 having a plurality of circumferentially spaced apart turbine rotor blades 14 extending radially outwardly from the rotor perimeter, and secured in axial dovetail slots in the rotor by corresponding axial dovetails at the inner ends of the rotor in a manner well-known in the art. The outer ends of the blades define airfoils over which hot combustion gases 16 flow during operation. The rotor blades 14 extract energy from the gases so as to rotate the rotor, in turn powering a multistage axial compressor (not shown) through a corresponding driveshaft 18.

An annular, forward blade retainer 20 in the form of a disk has a radially outer portion adjoining blades 14 to block axially forward movement of the rotor, and an inner portion which adjoins an annular spacer 22 that in turn adjoins a radial flange of driveshaft 18 through which a plurality of fasteners 24 (one of which is shown) extend for clamping together these parts to rotor 12. The fasteners are in the exemplary form of cylindrical bolts, each having an integral bolt head at one end and threaded at an opposite end for receiving thereon corresponding nuts which are tightened during assembly for placing the fasteners in tension and clamping together the adjoining parts. The same fasteners 24 may also be used for mounting an axially aft blade retainer (not shown) to rotor 12 and to an aft portion of the driveshaft.

But for the present invention, turbine 10 and its various components are conventional in configuration and operation. A suitable number of fasteners 24 are typically arranged in a common bolt-hole circle at a radius R from the axial centerline axis of the rotor 12. The number of fasteners commonly exceeds 30 or 40 at each assembled joint.

Figure 2:
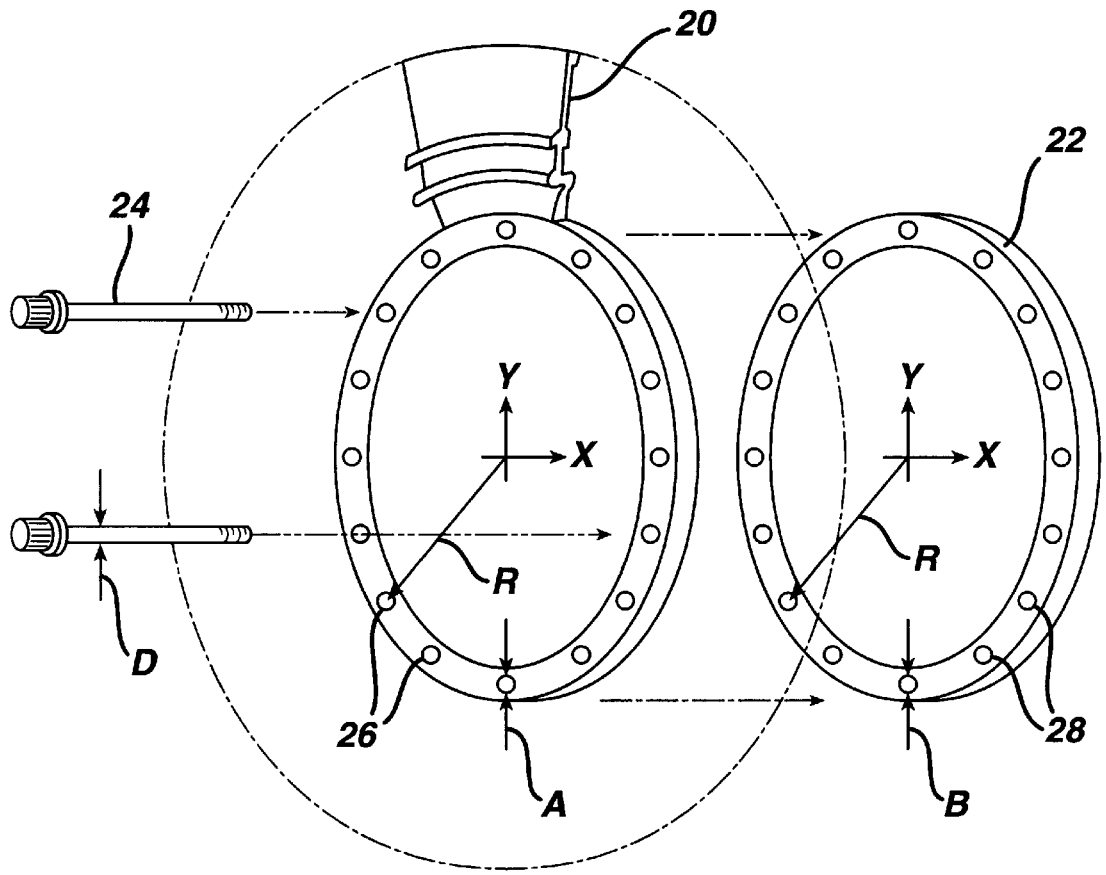
FIG. 2 is an exploded view of two of the annular parts illustrated in FIG. 1, including exemplary fasteners sized to extend through mounting holes or apertures in the parts in order to form a floating fastener joint.

Two exemplary parts of the bolted joint are illustrated in exploded view in FIG. 2, with a first part 20 being the forward blade retainer, and the second part 22 being the cooperating spacer. However, two or more parts of any configuration may be bolted together using fasteners 24 in accordance with the present invention.

As shown in FIG. 2, forward blade retainer 20 includes an annular array of first apertures or holes 26 which are circular in the exemplary embodiment, and each has a common or uniform nominal first diameter A. The first holes 26 are arranged in a bolt-hole circle of radius R measured from the axial centerline of the first part to the corresponding centers of the individual holes. The individual holes are preferably equidistantly spaced apart from each other around the circumference of the part. Similarly, the second part 22 includes an annular array of second apertures or holes 28 which are also circular, with each having a common or uniform nominal second diameter B. The second holes 28 are also arranged in a bolt-hole circle having a radius R to match that of the first holes 26, and are also equidistantly spaced apart from each other around the circumference of the second part 22.

Correspondingly, fasteners 24 have cylindrical shafts, each with a common or uniform third nominal diameter D.

During assembly, the two parts 20, 22 illustrated in FIG. 2 must be suitably aligned so that the respective first and second holes 26,28 are aligned in mating hole pairs for receiving therethrough a corresponding one of bolts 24. The two parts 20,22 and a fastener 24 are illustrated in FIG. 1 assembled together in a clamped joint with driveshaft 18 and rotor 12.

In a typical configuration, diameters A,B of respective bolt-holes 26,28 are preferably identical to each other, and the diameter D of bolts 24 is as large as practical, yet slightly smaller than the bolt-holes diameter. This permits assembly of the parts while maximizing the bolted joint strength and introducing little or no unbalance due to geometrical variation around the respective bolt-hole circles.

The sizes of the holes and fasteners represented by their respective diameters, and the positions of individual holes 26,28, are subject to random or statistical variation during their manufacture. The individual bolts may be cast or forged to near-net shape, with or without subsequent machining to achieve the desired nominal diameter D. Correspondingly, the individual holes 26,28 are typically drilled through the mating parts by a precision drilling machine. The positions of individual holes 26,28 and their diameters A,B are therefore subject to the limited accuracy of the drilling machine used, and are also subject to random variation where no two holes are likely to be identical. Similarly, the diameters D of bolts 24 are subject to random variation with no two holes or bolts likely being identical.

Accordingly, when the two parts are aligned together during assembly, variation in positions of the mating holes will cause local offset between the hole centers which may be large enough to cause radial overlapping of one or more of the mating holes, decreasing the available space through which the corresponding bolt or bolts may be inserted. Sufficient clearance between the outer diameters of the individual bolts and the inner diameters of the mating holes is required to allow insertion of the individual bolts through the respective parts in a floating fastener assembly.

Since holes 26,28 cannot be positioned exactly in their respective parts, and since the holes and fasteners 24 cannot be manufactured to exact size and shape, tolerancing is required to ensure an acceptable probability of successful assembly. The parts and fasteners may be assembled in a floating fastener assembly based on Monte Carlo simulation applied to the exemplary bolt-hole circle example described, but equally applicable to other configurations of floating fastener assemblies.

In a preferred embodiment of the invention, a closed-form analysis of floating-fastener assemblies, which includes finding a best-fit position for parts and fasteners subject to random variations in size and position, is performed. Monte Carlo simulation is used in modelling the assembly process. During a complete simulation, variations in parts and fasteners are generated, following assumed statistical models. Particular instances of parts and fasteners are analytically assembled, and the clearance or interference conditions at their optimized best-fit positions recorded. After a number of trial assemblies, an experimentally-derived statistical model for the assembly clearance/interference is available for specifying position and size variations to improve manufacturing.

Conventional software, such as Microsoft Excel with a Crystal Ball add-in, by Decisioneering Inc., Denver, Colo., may be used to build the Monte Carlo simulation model. The model is general and can be applied to an arbitrary arrangement of holes, using different statistical models for position and size variations. As a demonstration application, tolerancing of the two turbine parts 20,22 joined with circular fasteners 24 through holes 26,28 arranged in bolt-hole circles is presented.

The method begins by mathematically modeling the floating fastener assembly of parts. This is readily accomplished, as shown in FIG. 2, by using a suitable coordinate system to define the geometrical position of the individual bolt-holes 26,28 in respective parts 20,22. For example, a Cartesian coordinate system including X and Y axes may be used to define the center location of each hole 26,28 relative to the respective centerline axis of the respective part. Alternatively, a polar coordinate system may be used to define the center location of each hole as represented by a radius from the center of the part and the circumferential angle from a reference axis. The polar system is preferred when a drilling machine having a rotary table is used for drilling holes 26,28 in respective parts 20,22.

During actual assembly, the two parts 20,22 are placed in contact with each other and are then translated and rotated relative to one another until all the fasteners can pass through their respective holes. In the corresponding analytical model, all holes and fasteners are assumed to be circular and perfectly formed, although their sizes may be subject to random variations. It is further assumed that the parts slide unconstrained on a plane, and that the holes are perpendicular to the plane of motion.

Figure 3:
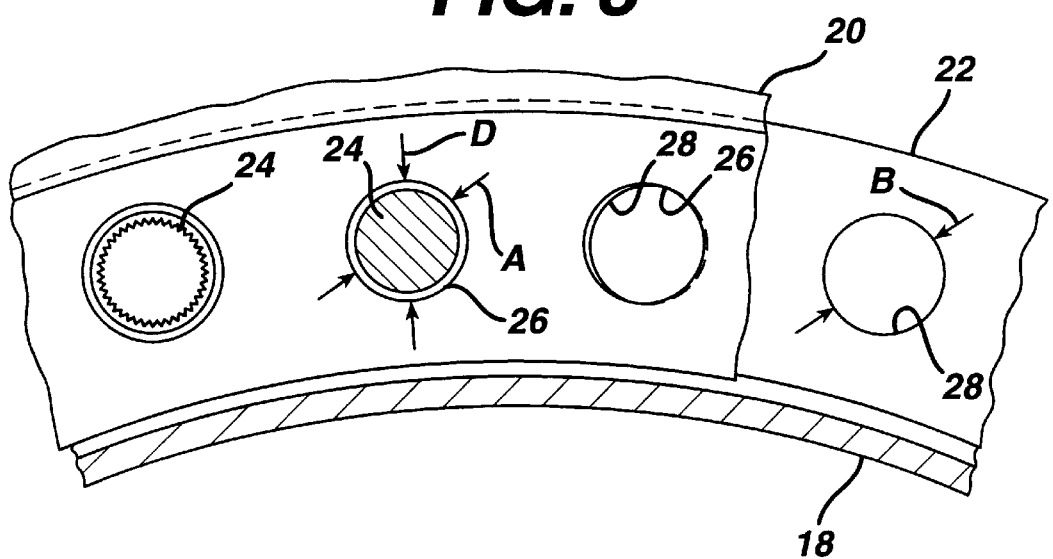
FIG. 3 is a front elevational view, partly in section, of portions of the exemplary annular parts joined together in FIG. 1 and taken along line 3—3.

FIG. 3 illustrates an exemplary assembly of the two parts with some of the fasteners in place. For successful assembly, mating holes 26,28 must be accurately aligned with each other to provide a complete through-hole of sufficient size for receiving a corresponding one of the bolts 24 without interference or obstruction. The floating fastener assembly may be mathematically or analytically modeled for use in specifying the positions and sizes of the many holes, the sizes of the fasteners, and acceptable variations or tolerances to ensure acceptable assembly without obstruction.

Figure 4:
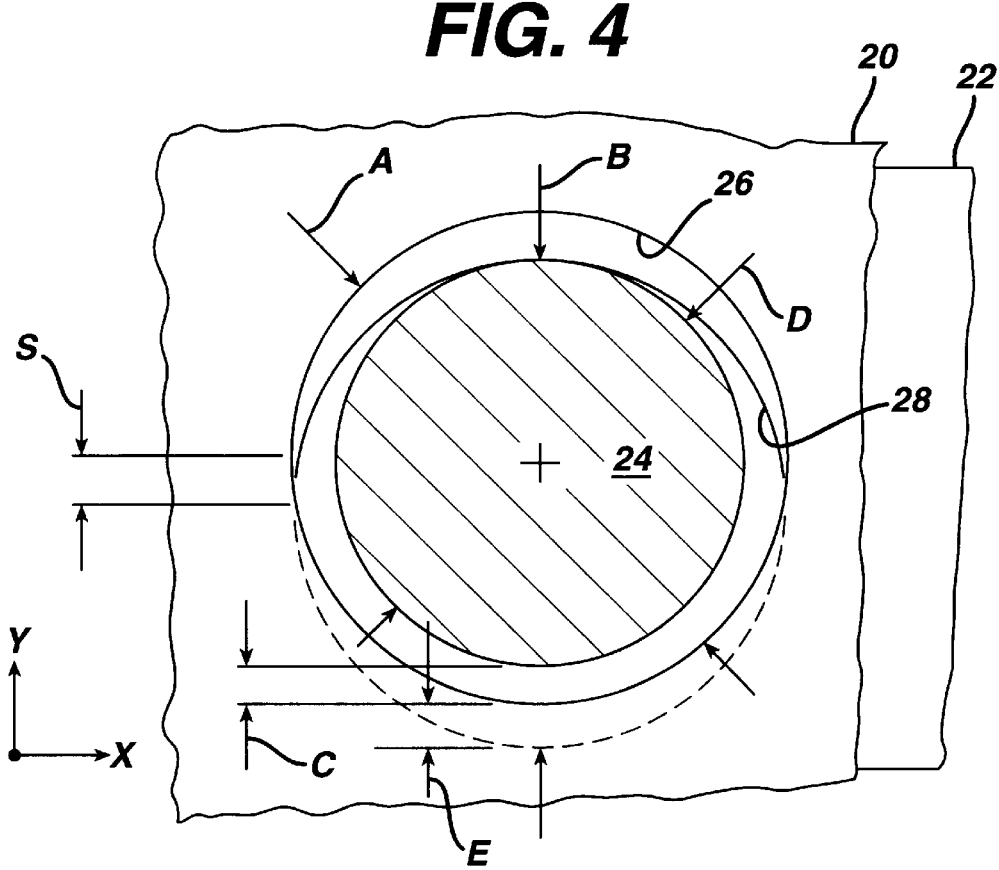
FIG. 4 is an enlarged view of an exemplary pair of mounting holes with a floating fastener extending therethrough and sized in accordance with an exemplary embodiment of the invention.

FIG. 4 illustrates a generic model used for each of the mating hole pairs and a corresponding fastener. A first hole 26 has a nominal diameter A, a second hole 28 has a nominal diameter B, and a fastener 24 has a nominal diameter D. Their positions in space are determined by the X,Y coordinates of the centers of each of the first and second holes 26,28 around their respective bolt-hole circles at the nominal radius R.

Figure 5:
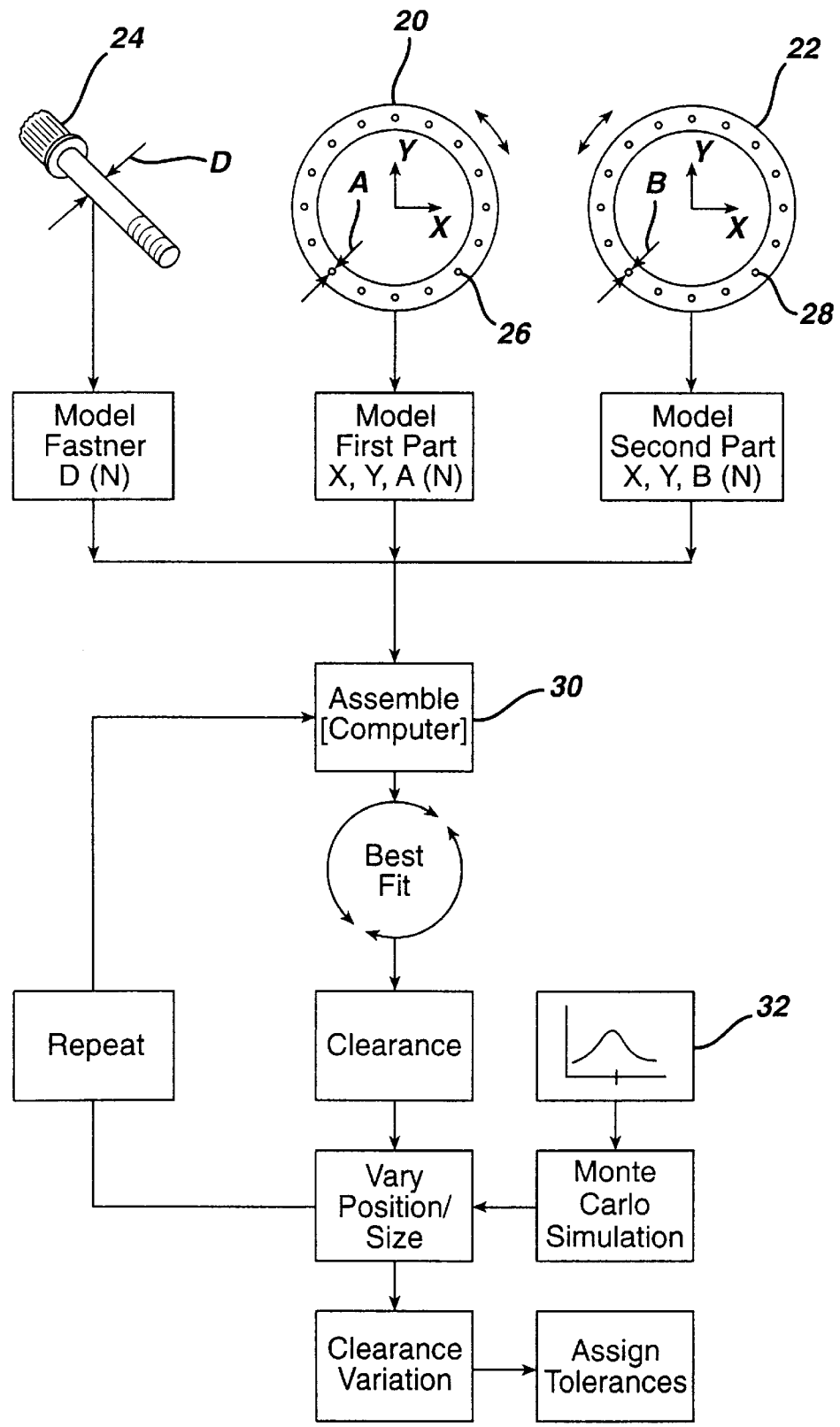
FIG. 5 is a flowchart representation of an exemplary embodiment of the invention for tolerancing floating fasteners and mating holes of the type illustrated in FIG. 4.

As shown in flowchart form in FIG. 5, the parts and fasteners are initially analytically modeled by the coordinate position of individual holes 26,28, their diameter sizes A,B, and the corresponding diameter size D of the fasteners. Any suitable number N of the holes in each part and corresponding fasteners may be modeled, and in a typical gas turbine engine bolt-circle example, the number N will be forty (40) or more, depending upon the particular parts being joined, be they rotor or stator components.

The tolerancing method, as shown in FIG. 5, is preferably performed in a digitally programmable computer 30 using appropriate software. For example, Microsoft Excel software may be used for modeling the assembly of the parts and fasteners using a suitable equation, and Crystal Ball software may be used to build Monte Carlo simulation models representing a substantial number of trial assemblies of the components with statistical variation in their positions and sizes.

Different geometric models of the floating fastener assembly may be derived with different degrees of complexity. The hole diameters A,B, and the fastener diameter D, as shown in FIG. 4, are primary parameters. One or more of these parameters may be varied according to assumed statistical models.

If hole centers are aligned, the clearance C between a pair of mating holes and a fastener in the holes is governed by the size difference between the fastener and smallest hole. As the holes become offset, and as long as the edges of the holes do not overlap, the clearance continues to be governed by the diameters of the fastener and the smallest hole. In general, when edges do not overlap:

$$\text{clearance} = C = \min(A,B) - D \qquad (1)$$

In equation (1), the difference between the minimum diameter A or B of either mating hole 26,28 and the bolt diameter D represents the clearance expressed as a positive value. A negative clearance value means the fastener is too large, and would fit in the mating holes only in an interference fit.

When the offset is equal to $|A-B|/2$, the edges of the holes touch, and for any greater offsets, i.e. radial overlap E, the amount of offset comes into play when calculating clearances because the radial overlap reduces the available space for inserting the bolt.

A geometric construction shows that when the edges of two circles with offset centers overlap as shown in FIG. 4, the largest circle, with zero clearance, that can be inscribed within them is equal to their average diameter, minus the amount of offset. In terms of clearance, $$\text{clearance} = C = (A+B)/2 - \text{offset} - D \qquad (2)$$

At the transition offset, where the circle edges just touch:

$$\text{clearance} = C = (A+B)/2 - (A-B)/2 - D = B - D \qquad (3)$$

which is the expected result from equation (2) where B is assumed smaller than A.

Accordingly, in a single equation to model clearance in a single pair of mating holes:

$$\text{clearance} = C = \min(A, B, ((A+B)/2 - \text{offset})) - D \qquad (4)$$

This equation (4) accounts for the possible variations in the sizes of A,B,D and offset S in hole center positions. The offset S is readily determined by the X,Y positions of the mating holes 26,28.

The amount of offset S between same-size holes is defined as the maximum amount of material overlap. The diameter of the largest floating fastener that will fit through overlapping holes of the same size, i.e., A=B, is equal to the diameter of the holes minus the amount of offset, or A−S, and may be determined from equation (4) using zero clearance.

For an assembly best-fit analysis, one part is held fixed and the other is slid (X and Y) and rotated (angle) in an optimization process until the maximum amount of offset between all pairs of holes is minimized, i.e., min-max offset, which represents the best-fit. This is the condition under which identical fasteners of the largest possible diameter can be fit through all holes.

With more than three holes, the minimum maximum (min-max) offset conditions usually occur simultaneously at three hole pairs. However, with some hole arrangement geometries, a min-max condition happens at only two hole pairs. Suitable optimization software such as Excel's Solver may be used to find the best-fit position.

Accordingly, the geometrical model defined by equation (4) may be used to advantage in analytically assembling the two parts 20,22 and fasteners 24 in a suitable number of statistical trials to predict the probability of successful assembly of the floating fasteners for variation in hole position, as well as for variation in size of the holes and fasteners if desired.

As indicated above, the tolerancing method commences with modeling of position and size of apertures 26,28 in a modeled assembly of mating parts 20,22 to initially determine offset S(n) between each of the N mating bolt-holes as shown in FIG. 4. An offset value S(n) may be calculated for each of the total number of first holes 26 mated to the corresponding second holes 28.

In a simple embodiment evaluating bolt-hole positional variation only, the sizes A(n),B(n) of holes 26,28 may be assumed constant and equal to each other, and positional offset S(n) between the mating holes may then be determined. In an initial trial wherein mating apertures 26,28 are perfectly aligned, and have the same diameters, a zero value of offset may be calculated for each of the mating hole pairs. However, this ideal trial configuration has no inherent value in the overall method. In practice, the modeling preferably commences with some positional variation for determining a non-zero offset at any one or more of the mating holes. The analysis is further used to best-fit together the modeled parts 20,22 to minimize the maximum offset between the mating holes. As indicated earlier, suitable software may be used to conduct this analysis to obtain the best-fit position between mating parts 20,22 for minimizing the maximum offset in the many mating hole pairs.

For symmetrical parts, the multiple first holes 26 may be repeatedly indexed with different ones of the multiple second holes 28 in each best-fit trial for additional value if desired. However, a single best-fit trial is sufficient for both symmetrical and non-symmetrical parts.

In an additional trial, each of the aperture positions in each of parts 20,22 is randomly or statistically varied using a Monte Carlo simulation, which is representative of the random nature in which the bolt-holes would be drilled in an actual part. The offset between the mating bolt-holes is then redetermined, and the minimized maximum offset in the best-fit assembly of the two parts is also repeated.

Each trial represents a statistical variation in bolt-hole position in the two parts, with the resulting min-max offset in the trial being recorded in a suitable memory in the computer.

The process continues by repeating the statistical variation and best-fit offset redetermination for a statistically significant total number of trials which may be from about 100 to about 10,000 trials for example. In this way, the bolt-hole geometry of the two parts is analytically modeled and varied statistically over a suitable number of trials for determining the respective min-max offsets.

From these statistical data, engineering judgment may be used for selecting or determining the maximum diameter D of fasteners 24 for unobstructed assembly through the mating holes in the parts, with corresponding variations or tolerances. By determining the statistical variation distribution in the modeled parts, a more precise size range of the required fastener diameters may be determined for substantially increasing the likelihood of successful assembly of the parts without bolt interference in the mating holes, while at the same time maximizing the size of the fasteners within the available spaces of the mating holes.

In the embodiment illustrated in FIG. 5, the diameters D(n) of fasteners 24 may be modeled along with the positions and sizes of holes 26, 28 to analytically determine respective clearances C(n) for each of the fasteners in corresponding mating holes in the parts, as represented by equation (4).

In each trial, a clearance value may be obtained for each of the several mating holes receiving a respective fastener 24. A negative clearance is indicative of an interference fit between the corresponding fastener and its mating holes. Accordingly, all of the mating holes in a given trial are evaluated for determining the minimum clearance, or maximum interference, for that trial. The fasteners and parts are then best-fit together to maximize the minimum clearance between them.

For an assembly best-fit analysis, one part is held fixed and the other is slid (X and Y) and rotated (angle) in an optimization process until the minimum amount of clearance between all pairs of holes and fasteners is maximized, i.e., max-min clearance in FIG. 5, which represents the best-fit. By repeating the statistical variation of hole position and size, and fastener size, for a statistically significant number of trials, a corresponding number of max-min clearances are obtained for further analysis.

Figure 6:
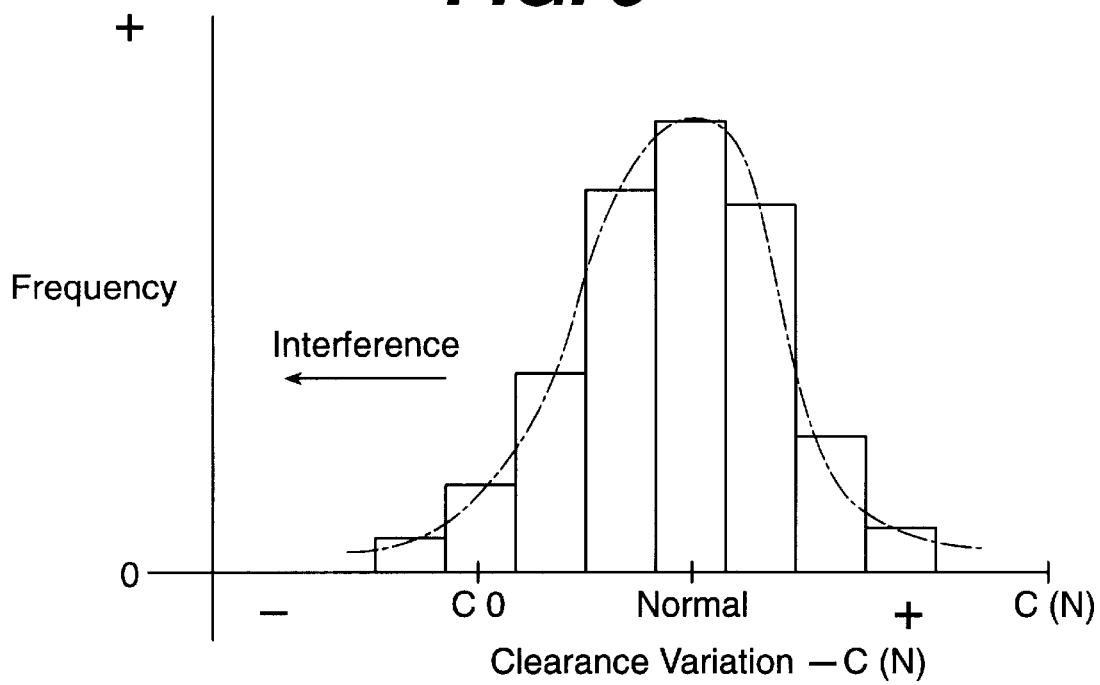
FIG. 6 is an exemplary histogram illustrating frequency distribution of modeled clearance variation obtained from the method illustrated in FIG. 5.

An exemplary histogram of clearance variation from the completed trials is illustrated in FIG. 6. The frequency distribution or number of occurrences for corresponding values of the clearance variation are plotted and will follow some statistical distribution which is typically center peaked at a nominal value associated with the nominal values of hole position and size and fastener size. Both larger and smaller clearance values, including zero clearance as well as negative clearance indicative of interference, are also plotted on opposite sides of the peak.

The FIG. 6 histogram clearance variation is the mathematical summary of a significant number of trial assemblies for the corresponding parts and fasteners which may advantageously be analyzed to more accurately select a variation range for the aperture positions, aperture sizes, fastener sizes, or various combinations thereof, based on variation in the minimum clearance trials. This improved method therefore constitutes an analytical tool for systematically varying the controlling assembly parameters for predicting probabilities of assembly with or without interference, which may then be used for optimizing positions and sizes of the mating holes and fasteners. These positions and sizes are specified in corresponding manufacturing specifications, with associated acceptable variations or tolerances typically expressed in plus and minus mil (0.0254 mm) deviations from the nominal.

As illustrated in FIG. 5, the diameters D(n) of fasteners 24 may be statistically varied from a nominal value along with the statistical variation of the positions of mating holes 26, 28. Furthermore, the diameter sizes A(n),B(n) of mating apertures 26, 28 may also be statistically varied along with their positions. In a preferred embodiment, all of the position and size variables found in equation (4) may be statistically varied in corresponding Monte Carlo simulations for each of the many trials conducted according to the procedure shown in FIG. 5 for obtaining a corresponding minimum clearance for the fasteners in their mating holes in each trial. Any suitable statistical distribution 32, as illustrated schematically in FIG. 5, may be applied to each of the controlling size and position parameters. These distributions may take any conventional form, such as normal or others.

In a preferred embodiment, the statistical variation includes varying each of hole diameter A(n),B(n) and fastener diameter D(n), and the hole positions, as represented by their offsets, in each of the several trials. In other embodiments, only one of the various control parameters found in equation (4) may be statistically varied for analysis.

As indicated above, the best-fit analysis during the assembly of mating parts 20,22 may be effected in any suitable manner using suitable software specifically configured to accomplish this result. For example, the maximum offset in the array of mating holes may be minimized, or the minimum clearance may be maximized, by holding constant the aperture positions of one of the two parts 20,22 and then translating and rotating in unison the aperture positions of the second one of the two parts relative to the first part. In this way, one part is mathematically overlaid atop the other part for matching the alignment of the corresponding mating holes, and adjusted for a best-fit alignment between the corresponding holes. This may be repeated for symmetrical parts by indexing the two parts one hole at a time in each trial, until all possible alignment combinations of the two parts have been exhausted.

The histogram result of the clearance variation illustrated in FIG. 6 may be used in various manners for improving assembly of the fasteners and corresponding parts. For example, the nominal fastener diameter D and a corresponding tolerance may be selected based on the minimum clearance trials presented in the histogram to minimize the clearances in mating holes 26,28 without causing interference that prevents a fastener from passing completely through the holes.

In another example, nominal diameter sizes A,B and corresponding tolerances for mating apertures 26,28 may be selected based on the maximum-minimum clearance trials represented by the histogram to minimize the clearances in mating apertures 26,28 without causing interference that prevents any of fasteners 24 from passing through the mating holes. Engineering judgment may be used for improving the combination of size and respective tolerances, as well as position and respective tolerances, in order to ensure unobstructed assembly of the fasteners and parts, while maximizing the size of the fasteners themselves.

The Crystal Ball software allows a wide choice of statistical models for the Monte Carlo simulation. The choices made for the bolt-hole assembly analysis, as described below, could easily be changed.

In one embodiment, it may be assumed that X and Y variations about nominal are independent and each may have a zero-mean Normal distribution with the same standard deviation. Under these assumptions, distance from nominal is Rayleigh-distributed.

For parts that may be centered on a rotary table for drilling, error models for radial and tangential positioning errors, rather than X and Y errors, are more appropriate. When radial and tangential error components each have a zero mean and the same standard deviation, analysis is the same as for X-Y position errors with the same standard deviations.

If, as often observed, standard deviations of errors in tangential and radial directions are different, the distance between hole centers and nominal is no longer Rayleigh distributed, and the radial-tangential and X-Y positional error distributions are no longer equivalent.

It is possible to extend the Crystal Ball Monte Carlo/Excel Solver approach to floating fasteners passing through three or more multiple parts. The optimization process involves three more variables (X,Y and angle) to be optimized for each additional part, along with some geometric calculations to find the smallest circle that encloses the centers of all coincident holes as they are moved.

Accordingly, the invention may be used to mathematically model and analyze floating fastener assemblies in a statistically meaningful number of trials to obtain suitable tolerancing of the controlling size and position parameters to ensure unobstructed assembly of the components with minimum clearances therebetween.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of tolerancing fasteners and apertures for assembling a plurality of parts having mating pluralities of said apertures receiving respective ones of said fasteners, comprising:

modeling positions and sizes of said apertures in an assembly of said parts;

best-fitting together said parts;

statistically varying said aperture positions in said parts;

repeating the best-fitting together of said parts and statistical variations of said aperture positions for a statistically significant number of trials to create a statistical model; and selecting size of said fasteners for assembly through said mating apertures as determined in said statistical model.

2. The method according to claim 1 wherein:

the step of modeling positions and sizes of said apertures includes determining maximum offset between mating ones of said apertures; and the step of best-fitting together said parts comprises minimizing said maximum offset between said mating apertures.

3. The method according to claim 2 wherein said maximum offset is minimized by holding constant said aperture positions in a first one of said parts, and translating and rotating in unison said aperture positions in a second one of said parts relative to said first part.

4. The method according to claim 1 wherein;

the step of modeling positions and sizes of said apertures includes modeling size of said fasteners; and the step of best-fitting together said parts includes best-fitting said fasteners within said apertures.

5. The method according to claim 4 wherein:

the step of modeling positions and sizes of said apertures includes selecting a variation range for said aperture positions.

6. The method according to claim 5 wherein:

the step of modeling positions and sizes of said apertures further includes determining minimum clearance for the modeled fasteners best-fitted within said apertures; and the step of best-fitting together said parts comprises maximizing said minimum clearance between said fasteners and mating apertures therefore.

7. The method according to claim 6, wherein:

the step of best-fitting together said parts includes the step of statistically varying size of said fasteners along with positions of said apertures.

8. The method according to claim 7 wherein:

the step of best-fitting together said parts includes the step of statistically varying sizes of said apertures along with said positions thereof.

9. The method according to claim 8 wherein:

said apertures in a first one of said parts are round holes having a first diameter A, and arranged in a circle;

said apertures in a second one of said parts are round holes having a second diameter B, and arranged in a circle;

said fasteners are cylindrical bolts having a third diameter D; and said minimum clearance C is affected by said diameters and maximum offset, and is represented by $C=\min(A, B, ((A+B)/2-\text{offset}))-D$.

10. The method according to claim 9 wherein the step of statistically varying sizes of said apertures and said positions thereof includes varying each of said diameters and offset between mating ones of said apertures in each of said trials.

11. A method according to claim 6 wherein said minimum clearance is maximized by holding constant said aperture positions in a first one of said parts, and translating and rotating in unison said aperture positions in a second one of said parts relative to said first part.

12. The method according to claim 7 wherein said fastener size and variation are selected based on said minimum clearance trials to minimize clearance in said mating apertures without causing interference that prevents assembly of said fasterners in said mating apertures.

13. The method according to claim 12 further comprising selecting size and variations of said apertures based on said minimum clearance trials to minimize clearance in said mating apertures without causing interference that prevents assembly of said fasteners in said mating apertures.

14. The method according to claim 8 further comprising selecting size and variations of said apertures based on said minimum clearance trials to minimize clearance in said mating apertures without causing interference that prevents assembly of said fasteners in said mating apertures.

* * * * *